US010373183B1

(12) United States Patent
Jacobs, II et al.

(10) Patent No.: US 10,373,183 B1
(45) Date of Patent: *Aug. 6, 2019

(54) AUTOMATIC FIRM FABRICATION PRICE QUOTING AND FABRICATION ORDERING FOR COMPUTER-MODELED JOINING FEATURES AND RELATED STRUCTURES

(71) Applicant: Alekhine, LLC, New London, NH (US)

(72) Inventors: James L. Jacobs, II, Amherst, NH (US); Steven M. Lynch, Hudson, NH (US)

( * ) Notice: Subject to any disclaimer, the term of this patent is extended or adjusted under 35 U.S.C. 154(b) by 530 days.

This patent is subject to a terminal disclaimer.

(21) Appl. No.: 14/172,462

(22) Filed: Feb. 4, 2014

Related U.S. Application Data

(60) Provisional application No. 61/891,453, filed on Oct. 16, 2013.

(51) Int. Cl.
*G06Q 30/02* (2012.01)
(52) U.S. Cl.
CPC .............................. *G06Q 30/0206* (2013.01)
(58) Field of Classification Search
CPC ................................................. G06Q 30/0206
USPC ........................................................ 705/7.35
See application file for complete search history.

(56) References Cited

U.S. PATENT DOCUMENTS

| | | | |
|---|---|---|---|
| 4,495,559 | A | 1/1985 | Gelatt, Jr. et al. |
| 5,117,354 | A | 5/1992 | Long et al. |
| 5,465,221 | A | 11/1995 | Merat et al. |
| 5,495,430 | A | 2/1996 | Matsunari et al. |

(Continued)

FOREIGN PATENT DOCUMENTS

| | | |
|---|---|---|
| WO | 154476 A2 | 8/2001 |
| WO | 171626 A2 | 9/2001 |

(Continued)

OTHER PUBLICATIONS

Sorpas User Manual (Swantec Software and Engineering Aps, 2011) NPL provided by Applicant.*

(Continued)

*Primary Examiner* — Eric W Stamber
*Assistant Examiner* — George H Walker, III
(74) *Attorney, Agent, or Firm* — Caldwell Intellectual Propert

(57) ABSTRACT

A system that provides automatic/semi-automatic price quotations for joining one or more instantiations of a structure that is modeled in a computer model. The system automatically extracts joining price-influencing data from the computer model. The system uses the joining price-influencing data and joining pricing parameters to automatically determine a joining price quotation which can be provided as a standalone or be utilized to calculate firm fabrication-price quote(s) for the structure. In some embodiments, the system further includes fabrication ordering functionality that allows a user place a fabrication order with a fabricator based on the price quotation. Such systems can be implemented in any of a wide variety of manners, such as within a single computing device or across a communications network, among others. In some embodiments, functionalities of the system are integrated into computer-modeling software directly of via add-on software.

10 Claims, 4 Drawing Sheets

(56) References Cited

U.S. PATENT DOCUMENTS

| | | | |
|---|---|---|---|
| 5,552,995 A | 9/1996 | Sebastian | |
| 5,570,291 A | 10/1996 | Dudle et al. | |
| 5,655,087 A * | 8/1997 | Hino | G06F 17/50 |
| | | | 700/107 |
| 5,758,328 A | 5/1998 | Giovannoli | |
| 5,847,971 A | 12/1998 | Ladner et al. | |
| 5,870,719 A | 2/1999 | Maritzen et al. | |
| 5,937,189 A | 8/1999 | Branson et al. | |
| 6,031,535 A | 2/2000 | Barton | |
| 6,112,133 A | 8/2000 | Fishman | |
| 6,295,513 B1 | 9/2001 | Thackston | |
| 6,341,271 B1 | 1/2002 | Salvo et al. | |
| 6,343,285 B1 | 1/2002 | Tanaka et al. | |
| 6,611,725 B1 | 8/2003 | Harrison et al. | |
| 6,647,373 B1 | 11/2003 | Carlton-Foss | |
| 6,701,200 B1 | 3/2004 | Lukis et al. | |
| 6,750,864 B1 | 6/2004 | Anwar | |
| 6,834,312 B2 | 12/2004 | Edwards et al. | |
| 6,836,699 B2 | 12/2004 | Lukis et al. | |
| 6,859,768 B1 | 2/2005 | Wakelam et al. | |
| 6,917,847 B2 | 7/2005 | Littlejohn et al. | |
| 6,922,701 B1 | 7/2005 | Ananian et al. | |
| 7,006,084 B1 | 2/2006 | Buss et al. | |
| 7,058,465 B2 * | 6/2006 | Emori | G05B 19/40937 |
| | | | 700/100 |
| 7,079,990 B2 | 7/2006 | Haller et al. | |
| 7,085,687 B2 | 8/2006 | Eckenwiler et al. | |
| 7,089,082 B1 | 8/2006 | Lukis et al. | |
| 7,123,986 B2 | 10/2006 | Lukis et al. | |
| 7,134,096 B2 | 11/2006 | Brathwaite et al. | |
| 7,299,101 B2 | 11/2007 | Lukis et al. | |
| 7,305,367 B1 | 12/2007 | Hollis et al. | |
| 7,327,869 B2 | 2/2008 | Boyer | |
| 7,343,212 B1 | 3/2008 | Brearley et al. | |
| 7,359,886 B2 | 4/2008 | Sakurai et al. | |
| 7,366,643 B2 | 4/2008 | Verdura et al. | |
| 7,369,970 B2 | 5/2008 | Shimizu et al. | |
| 7,418,307 B2 | 8/2008 | Katircioglu | |
| 7,467,074 B2 | 12/2008 | Faruque et al. | |
| 7,496,487 B2 | 2/2009 | Wakelam et al. | |
| 7,496,528 B2 | 2/2009 | Lukis et al. | |
| 7,499,871 B1 | 3/2009 | McBrayer et al. | |
| 7,523,411 B2 | 4/2009 | Carlin | |
| 7,526,358 B2 * | 4/2009 | Kawano | G06F 17/50 |
| | | | 700/146 |
| 7,529,650 B2 | 5/2009 | Wakelam et al. | |
| 7,565,139 B2 | 7/2009 | Neven, Sr. et al. | |
| 7,565,223 B2 | 7/2009 | Moldenhauer et al. | |
| 7,567,849 B1 | 7/2009 | Trammell et al. | |
| 7,568,155 B1 | 7/2009 | Axe et al. | |
| 7,571,166 B1 | 8/2009 | Davies et al. | |
| 7,574,339 B2 | 8/2009 | Lukis et al. | |
| 7,590,466 B2 | 9/2009 | Lukis et al. | |
| 7,590,565 B2 | 9/2009 | Ward et al. | |
| 7,603,191 B2 | 10/2009 | Gross | |
| 7,606,628 B2 | 10/2009 | Azuma | |
| 7,630,783 B2 | 12/2009 | Walls-Manning et al. | |
| 7,656,402 B2 | 2/2010 | Abraham et al. | |
| 7,689,936 B2 | 3/2010 | Rosel | |
| 7,733,339 B2 | 6/2010 | Laning et al. | |
| 7,747,469 B2 | 6/2010 | Hinman | |
| 7,748,622 B2 | 7/2010 | Schon et al. | |
| 7,761,319 B2 | 7/2010 | Gil et al. | |
| 7,822,682 B2 | 10/2010 | Arnold et al. | |
| 7,836,573 B2 | 11/2010 | Lukis et al. | |
| 7,840,443 B2 | 11/2010 | Lukis et al. | |
| 7,908,200 B2 | 3/2011 | Scott et al. | |
| 7,957,830 B2 | 6/2011 | Lukis et al. | |
| 7,979,313 B1 | 7/2011 | Baar | |
| 7,993,140 B2 | 8/2011 | Sakezles | |
| 8,000,987 B2 | 8/2011 | Hickey et al. | |
| 8,024,207 B2 | 9/2011 | Ouimet | |
| 8,140,401 B2 | 3/2012 | Lukis et al. | |
| 8,170,946 B2 | 5/2012 | Blair et al. | |
| 8,175,933 B2 | 5/2012 | Cook, Jr. et al. | |
| 8,180,396 B2 | 5/2012 | Athsani et al. | |
| 8,209,327 B2 | 6/2012 | Danish et al. | |
| 8,239,284 B2 | 8/2012 | Lukis et al. | |
| 8,249,329 B2 | 8/2012 | Silver | |
| 8,271,118 B2 | 9/2012 | Pietsch et al. | |
| 8,275,583 B2 | 9/2012 | Devarajan et al. | |
| 8,295,971 B2 | 10/2012 | Krantz | |
| 8,417,478 B2 | 4/2013 | Gintis et al. | |
| 8,441,502 B2 | 5/2013 | Reghetti et al. | |
| 8,515,820 B2 * | 8/2013 | Lopez | G06F 17/5004 |
| | | | 705/1.1 |
| 8,554,250 B2 | 10/2013 | Linaker | |
| 8,571,298 B2 | 10/2013 | McQueen et al. | |
| 8,595,171 B2 | 11/2013 | Qu | |
| 8,700,185 B2 | 4/2014 | Yucel et al. | |
| 8,706,607 B2 | 4/2014 | Sheth et al. | |
| 8,768,651 B2 | 7/2014 | Bhaskaran et al. | |
| 8,798,324 B2 | 8/2014 | Conradt | |
| 8,806,398 B2 | 8/2014 | Brathwaite et al. | |
| 8,830,267 B2 | 9/2014 | Brackney | |
| 8,849,636 B2 | 9/2014 | Becker et al. | |
| 8,861,005 B2 | 10/2014 | Grosz | |
| 8,874,413 B2 | 10/2014 | Mulligan et al. | |
| 8,923,650 B2 | 12/2014 | Wexler | |
| 8,977,558 B2 | 3/2015 | Nielsen et al. | |
| 9,037,692 B2 | 5/2015 | Ferris | |
| 9,055,120 B1 | 6/2015 | Firman | |
| 9,106,764 B2 | 8/2015 | Chan et al. | |
| 2001/0023418 A1 * | 9/2001 | Suzuki | B29C 33/3835 |
| | | | 705/400 |
| 2001/0047251 A1 | 11/2001 | Kemp | |
| 2002/0065790 A1 | 5/2002 | Oouchi | |
| 2002/0087440 A1 | 7/2002 | Blair et al. | |
| 2002/0099579 A1 | 7/2002 | Stowell et al. | |
| 2002/0107673 A1 * | 8/2002 | Haller | G05B 19/41805 |
| | | | 703/1 |
| 2002/0152133 A1 | 10/2002 | King et al. | |
| 2003/0018490 A1 | 1/2003 | Magers et al. | |
| 2003/0069824 A1 | 4/2003 | Menninger | |
| 2003/0078846 A1 | 4/2003 | Burk et al. | |
| 2003/0139995 A1 * | 7/2003 | Farley | G06Q 10/06 |
| | | | 705/37 |
| 2003/0149500 A1 | 8/2003 | Faruque et al. | |
| 2003/0163212 A1 | 8/2003 | Smith et al. | |
| 2003/0172008 A1 | 9/2003 | Hage et al. | |
| 2003/0212610 A1 | 11/2003 | Duffy et al. | |
| 2003/0220911 A1 | 11/2003 | Tompras | |
| 2004/0008876 A1 | 1/2004 | Lure | |
| 2004/0113945 A1 | 6/2004 | Park et al. | |
| 2004/0195224 A1 * | 10/2004 | Kanodia | B23K 9/0953 |
| | | | 219/125.1 |
| 2005/0055299 A1 | 3/2005 | Chambers et al. | |
| 2005/0125092 A1 | 6/2005 | Lukis et al. | |
| 2005/0144033 A1 | 6/2005 | Vreeke et al. | |
| 2005/0171790 A1 * | 8/2005 | Blackmon | G06Q 50/165 |
| | | | 705/315 |
| 2005/0251478 A1 | 11/2005 | Yanavi | |
| 2005/0273401 A1 | 12/2005 | Yeh et al. | |
| 2006/0085322 A1 * | 4/2006 | Crookshanks | G06Q 30/06 |
| | | | 705/37 |
| 2006/0185275 A1 | 8/2006 | Yatt | |
| 2006/0253214 A1 | 11/2006 | Gross | |
| 2007/0016437 A1 | 1/2007 | Elmufdi et al. | |
| 2007/0067146 A1 | 3/2007 | Devarajan et al. | |
| 2007/0073593 A1 | 3/2007 | Perry et al. | |
| 2007/0112635 A1 | 5/2007 | Loncaric | |
| 2007/0198231 A1 | 8/2007 | Walch | |
| 2008/0120086 A1 | 5/2008 | Lilley et al. | |
| 2008/0183614 A1 | 7/2008 | Gujral et al. | |
| 2008/0269942 A1 * | 10/2008 | Free | G06F 17/50 |
| | | | 700/182 |
| 2008/0281678 A1 | 11/2008 | Keuls et al. | |
| 2009/0058860 A1 | 3/2009 | Fong et al. | |
| 2009/0208773 A1 * | 8/2009 | Dupont | B22F 3/1055 |
| | | | 428/610 |
| 2009/0299799 A1 | 12/2009 | Racho et al. | |
| 2009/0319388 A1 | 12/2009 | Yuan et al. | |
| 2011/0040542 A1 | 2/2011 | Sendhoff et al. | |

(56) References Cited

U.S. PATENT DOCUMENTS

| | | | |
|---|---|---|---|
| 2011/0047140 | A1 | 2/2011 | Free |
| 2011/0209081 | A1 | 8/2011 | Chen et al. |
| 2011/0213757 | A1 | 9/2011 | Bhaskaran et al. |
| 2012/0016678 | A1 | 1/2012 | Gruber et al. |
| 2012/0072299 | A1 | 3/2012 | Sampsell |
| 2012/0230548 | A1 | 9/2012 | Calman et al. |
| 2012/0316667 | A1 | 12/2012 | Hartloff |
| 2013/0055126 | A1 | 2/2013 | Jackson |
| 2013/0075380 | A1* | 3/2013 | Albrech .............. B23K 9/1006 219/137 R |
| 2013/0097259 | A1 | 4/2013 | Li |
| 2013/0100128 | A1 | 4/2013 | Steedly et al. |
| 2013/0138529 | A1 | 5/2013 | Hou |
| 2013/0144566 | A1 | 6/2013 | De Biswas |
| 2013/0166470 | A1 | 6/2013 | Grala et al. |
| 2013/0218961 | A1 | 8/2013 | Ho |
| 2013/0293580 | A1 | 11/2013 | Spivack |
| 2013/0297320 | A1 | 11/2013 | Buser |
| 2013/0297460 | A1 | 11/2013 | Spivack |
| 2013/0311914 | A1 | 11/2013 | Daily |
| 2013/0325410 | A1 | 12/2013 | Jung et al. |
| 2014/0042136 | A1 | 2/2014 | Daniel et al. |
| 2014/0067333 | A1 | 3/2014 | Rodney et al. |
| 2014/0075342 | A1 | 3/2014 | Corlett |
| 2014/0098094 | A1 | 4/2014 | Neumann et al. |
| 2014/0157579 | A1 | 6/2014 | Chhabra et al. |
| 2014/0207605 | A1 | 7/2014 | Allin et al. |
| 2014/0229316 | A1 | 8/2014 | Brandon |
| 2014/0279177 | A1 | 9/2014 | Stump |
| 2014/0379119 | A1 | 12/2014 | Sciacchitano et al. |
| 2015/0055085 | A1 | 2/2015 | Fonte et al. |
| 2015/0066189 | A1 | 3/2015 | Mulligan et al. |
| 2015/0127480 | A1 | 5/2015 | Herrman et al. |
| 2015/0234377 | A1 | 8/2015 | Mizikovsky |

FOREIGN PATENT DOCUMENTS

| | | | |
|---|---|---|---|
| WO | 2001077781 | A2 | 10/2001 |
| WO | 2006086332 | A2 | 8/2006 |
| WO | 2007067248 | A2 | 6/2007 |
| WO | 2011139630 | A1 | 11/2011 |
| WO | 2011140646 | | 11/2011 |
| WO | 2011140646 | A1 | 11/2011 |
| WO | 2013058764 | A1 | 4/2013 |
| WO | 2014152396 | A2 | 9/2014 |

OTHER PUBLICATIONS

Defining Lead Time for APS Planning; http://t3.apptrix.com/syteline/Language/en-US/Other/Process/Defining_Lead_Time.htm.
"Quartiles." Mathisfun.com. Web. <https://www.mathsisfun.com/data/quartiles.html>. Archive. <https://web.archive.org/web/20100909011751/http://www.mathsisfun.com/data/quartiles.html>.
Wu et al. Interactive 3D Geometric Modelers with 2D UI, 2002, State University of Campinas, www.dca.fee.unicamp.br, Sao Paulo, Brazil; 2002, 8 pages.
"Upload Your Photos, Print a 3D Model with hypr3D." SolidSmack. http://www.solidsmack.com/cad-design-news/hypr3d-photo-video-3d-print/; last accessed on Oct. 13, 2015.
"123D Catch." Autodesk. http://apps.123dapp.com/catch/.
Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.
Dealer Information Systems Corporation. "Parts Inventory." http://dis-corp.com/content/agriculture/inventory/parts-inventory.
EMachineShop. "Emachineshop Features." http://www.emachineshop.com/machine-shop/Features/page518.html.
Retrieved from:http://www.solidworks.com/sw/products/3d-cad/manufacturing-cost-estimation-quoting.htm p. 1: Automatic Manufacturing Cost Estimation Overview; Solidworks; 2015.
Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.
http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.
Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.
http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05.
http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.
Matchbook, Tealbook, http://www.matchbookinc.com/ Sep. 28, 2015.
3Diligent, Source Smarter, http://www.3diligent.com/customer.html; Sep. 28, 2015.
Dassault Systemes, Brochure, Mar. 24, 2010: New Features Type3ToCatia http://www.type3.us/content/download/2202/405535/file/New%20Feature_Type3ToCatia_2010_US%20old.pdf.
Xue, S., X. Y. Kou, and S. T. Tan. "Natural voice-enabled CAD: modeling via natural discourse." Computer-Aided Design and Applications 6.1 (2009): 125-136.
Kou, X. Y., S. K. Xue, and S. T. Tan. "Knowledge-guided inference for voice-enabled CAD." Computer-Aided Design 42.6 (2010): 545-557.
Sharma, Anirudh, et al. "MozArt: a multimodal interface for conceptual 3D modeling." Proceedings of the 13th international conference on multimodal interfaces. ACM, 2011.
Sorpas ("User Manual,", Swanted Software and Engineering Aps, 2011 (120 pages)).
U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/060,033, filed Oct. 22, 2013.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

AUTOMATIC FIRM FABRICATION PRICE QUOTING AND FABRICATION ORDERING FOR COMPUTER-MODELED JOINING FEATURES AND RELATED STRUCTURES

FIELD OF THE INVENTION

The present invention generally relates to the field of computer-aided design and structure fabrication. In particular, the present invention is directed to automatic firm fabrication price quoting and fabrication ordering of computer-modeled joining features and related structures.

BACKGROUND

Technical specifications and engineering drawings typically convey a variety of information about a to-be-fabricated structure, such as a part or an assembly of components. Examples of such information includes information about geometry, materials, finishes, connections, hardware, special processes, dimensions, tolerances, and others things as known in the art. The documents are prepared by engineers; however, manufacturers (i.e., fabricators) rely on the documents for manufacturing preparation to build the desired structure, such as a part or an assembly of multiple components. There are differing skill levels involved on both the engineering side and the manufacturing side, which has led to a gap between the two stages involved in fabricating a structure.

Various changes in engineering and manufacturing have generally driven fabrication cost estimates to be created from the hardcopies of the documents, which causes several problems and disadvantages. As an initial matter, each estimator, i.e., the person developing a price quote for a particular part or assembly, will often interpret the information in the hardcopies differently due to their level of experience and/or other factors. Thus, using hardcopies, it can be extremely difficult, if not impossible, to maintain consistent pricing. Additionally, human reviewers can overlook key features on the hardcopies such that they are not included in the finished part and/or assembly. There is also often a lengthy time period required for quoting prototypes. All of the required documents may not be available using the hardcopy approach, and fabricators can be forced to use only the information that the engineers supply, which may be incomplete. If additional information is needed, further communication between the estimator and the engineer is required. Additionally, human interaction is required, which leads to errors and discrepancies between analyses performed by different people.

Also disadvantageously, using a hardcopy approach, preparing the paperwork for information not related to the drawings is often more time-consuming than designing the structure itself. Advanced calculations are needed to determine various information, such as, a perimeter length, flat area, holes sizes, flat size, sheet usage, etc., needed to create a cost estimate when employing hardcopies. Furthermore, missing information can typically only be obtained by contacting an engineer, which is time consuming and inefficient.

SUMMARY OF THE DISCLOSURE

In an implementation, the present disclosure is directed to a method of providing a firm fabrication-price quote for fabricating one or more instantiations of a structure. The method includes receiving, by a price-quoting system, a joining request; interrogating, by the price-quoting system, a computer model of the structure so as to extract a joining feature; generating, by the price-quoting system, joining feature pricing data as a function of the joining feature; generating, by the price-quoting system, a joining price quote; and conveying a price quote to a user as a function of the joining price quote.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
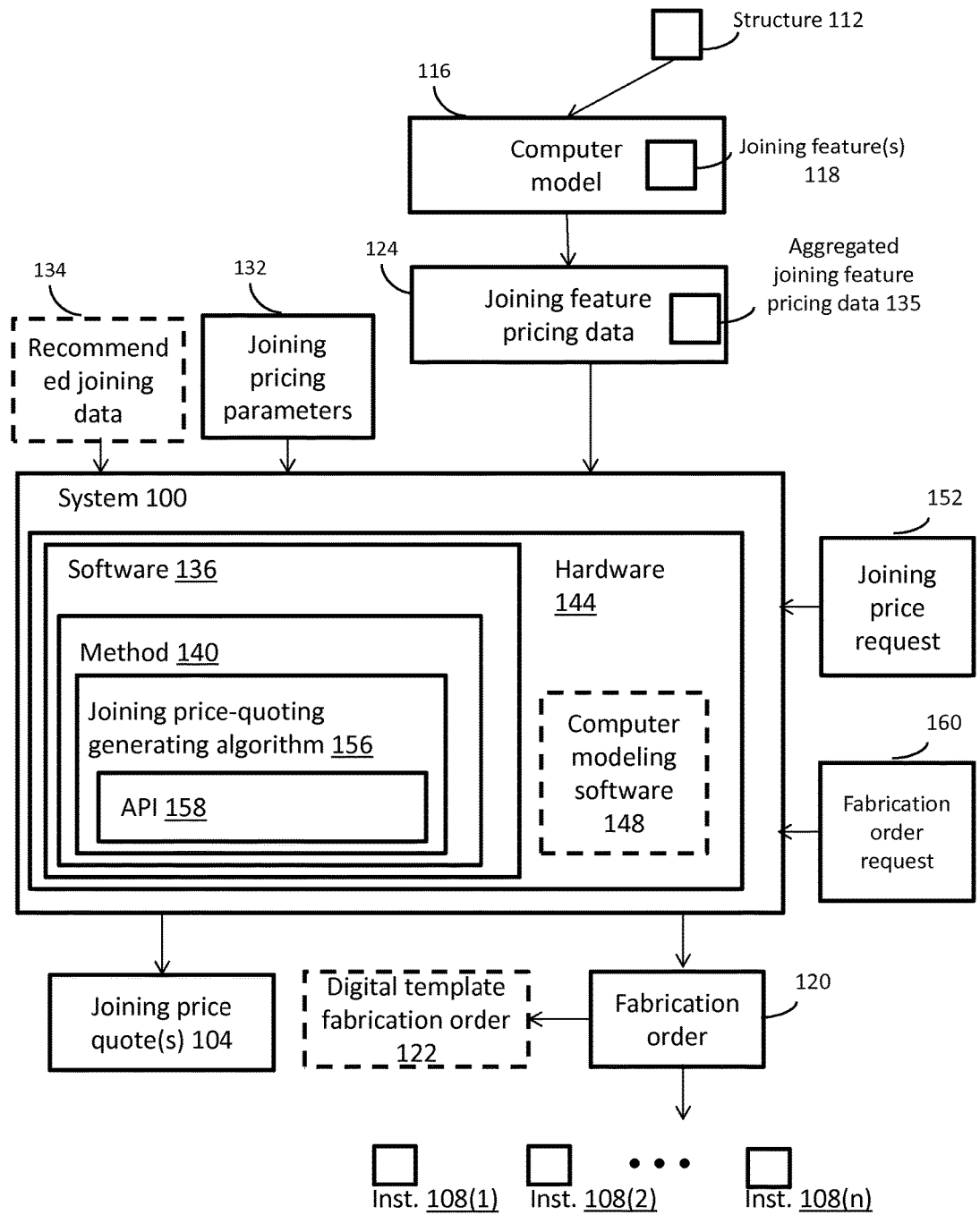
FIG. 1 is a high-level block diagram of a firm fabrication-price-quoting-and-ordering system made in accordance with the present disclosure.

Aspects of the present invention include software tools and techniques for automatically generating one or more price quotations for fabricating one or more instantiations of a structure that is represented in a computer model and contains joining feature(s). Using various ones of these tools and techniques, precise joining features and other pricing data can be used to create highly precise and highly repeatable firm fabrication-price quotes. Other aspects of the present invention include software tools and techniques for allowing a user to place an order for fabricating one or more instantiations of a computer modeled structure, such as in conjunction with the generating of the price quotation. Still other aspects of the present invention include systems for generating such price quotes and permitting such ordering. These and other aspects of the present invention will become readily apparent upon reviewing this entire disclosure. Before proceeding with describing numerous aspects of the present invention in detail, a number of definitions of certain terms used throughout this disclosure, including the appended claims, are first presented. These terms shall have the following meanings throughout unless noted otherwise. Like terms, such as differing parts of speech, differing tenses, singulars, plurals, etc., for the same term (e.g., fabricating, fabricate, fabrication, fabrications, fabricated) shall have commensurate meanings.

Structure: A "structure" can be any physical thing that can be made by or under the control of a human and/or under the control of one or more machines. For example, a "structure" can be made by hand, using one or more tools, using one or more pieces of machinery, or any combination thereof. Examples of structures include, but are not limited to objects, parts, and assemblies of components, buildings, vehicles, machines, semiconductor devices, computing devices, and electronic equipment, among many others.

Fundamentally, there is no limitation on what a "structure" can be other than that it is fabricated.

Fabricate: To "fabricate" a structure is perform a step or collection of steps needed to physically instantiate the structure. In this context, fabrication includes, but is not limited to steps of cutting, machining, milling, turning, making connections, molding, in particular injection molded parts, casting, stamping, forming, bending, etching, drilling, etc. Synonyms that fall within the meaning of "fabricate" herein include, but are not limited to manufacture, erect, assemble, mold, and form, among many others.

Computer model: A "computer model" is a virtual, for example, digital, model of a physical structure as created using appropriate computer-modeling software, such as SolidWorks (available from Dassault Systèmes SolidWorks Corp, Waltham, Mass.), AutoCAD (available from Autodesk, Inc., San Rafael, Calif.), and MicroStation (available from Bentley Systems, Inc., Exton, Pa.), among many others. A "computer model" can be of any type, such as a wireframe or solid model, among others, or any combination thereof, and can be saved in a computer file using any suitable file protocol, such as .SLDPRT, .SLDASM, .STP, .IGS. A "computer model" includes information about the geometry and/or other properties of the modeled structure.

Joining: A "joining" is a means that attaches portions of a structure together in such a way as to ensure that the overall structure is structurally sound (e.g., strong enough to resist and withstand the force loads expected of it). A joining can be made by hand, using one or more tools, using one or more pieces of machinery, or any combination thereof. Examples of joinings include, but are not limited to seam welds, stitch welds, spot welds, riveting, nails, screws, nuts and bolts, adhesives, fuses, among many others. Fundamentally, there is no limitation on what "joining" can mean other than that it attaches portions of a structure to one another.

Joining feature(s): A "joining feature" is a characteristic or attribute associated with a computer-modeled joining that influences the cost for a fabricator to fabricate the structure. Examples of "joining features" include, but are not limited to, geometry (such as size, shape, dimensions, areas, configurations, numbers of components and other features, such as openings, recesses, bosses, etc.), type(s) of material (in computer models wherein materials can be specified), connection type(s), and finish type(s) (in computer models wherein finishes can be specified), among others.

Joining Feature Pricing Data: "Joining feature pricing data" are input data to a system of the present disclosure that are extracted from a computer model and that influence the cost of joining one or more instantiations of the structure represented by the computer model. Examples of "joining feature pricing data" include, but are not limited to, geometry (such as size, shape, dimensions, areas, configurations, numbers of components and other features, such as openings, recesses, bosses, etc.), type(s) of material (in computer models wherein materials can be specified), connection type(s) and features (in computer models wherein such information can be specified), finish type(s) (in computer models wherein finishes can be specified), among others. Fundamentally, there is no limitation on the data that can constitute "joining feature pricing data," other than that they are present in a computer model and extractable therefrom and that they influence the cost of joining and, therefore, a joining price quote.

Recommended joining data: "Recommended joining data" are input data from a system of the present disclosure that may be used to provide alternate joining price quote(s) to a user. For example, recommended joining data may include a specific type of joining, one or more joining characteristics for a joining, quantitative parameter values for a joining, or qualitative parameter values for a joining.

With the foregoing terms and meanings in mind, reference is now made to FIG. 1, which illustrates a system 100 for providing one or more joining price quote(s) 104 for joining one or more instantiations 108(1) to 108(N) of a structure 112 represented by a computer model 116 containing joining feature(s) 118. As will also be seen, system 100 may optionally include features for allowing a user (not shown) to place a fabrication order 120 and/or digital template fabrication order 122, each based on at least joining price quote(s) 104. As described below in more detail, joining price quote(s) 104 are based on joining feature pricing data 124 and joining pricing parameters 132. In some embodiments, joining price quote(s) 104 may also be based on recommended joining data 134. In some embodiments, joining feature pricing data 124 may include aggregate joining feature price data 135. Aggregated joining feature price data 135 may include feature pricing data from one or more manufacturers and be obtained from one or more third party sources (not shown). Aggregated joining feature price data 135 may allow system 100 to provide one or more joining price quote(s) 104 from a plurality of manufacturers or businesses such that the user can compare quote(s). As will become readily apparent from reading this entire disclosure, system 100 includes software 136 for performing a method 140 of providing joining price quote(s) 104; optionally, providing a firm fabrication-price quote (not shown) for fabricating the structure; optionally, allowing a user to place fabrication order 120; and optionally, allowing a user to output digital template fabrication order 122. Digital template fabrication order 122 is an optional output file that has all the information that fabrication order 120 has, but can be inputted to a database, a spreadsheet, or other applicable sub-system (not shown in FIG. 1) for maintaining a repository of aggregate joining feature price data 135 that can optionally be utilized by method 140. Digital template fabrication order 122 may be, for example, expressed in a comma separated variable format or any other format that can be inputted to a database or spreadsheet.

Figure 2:
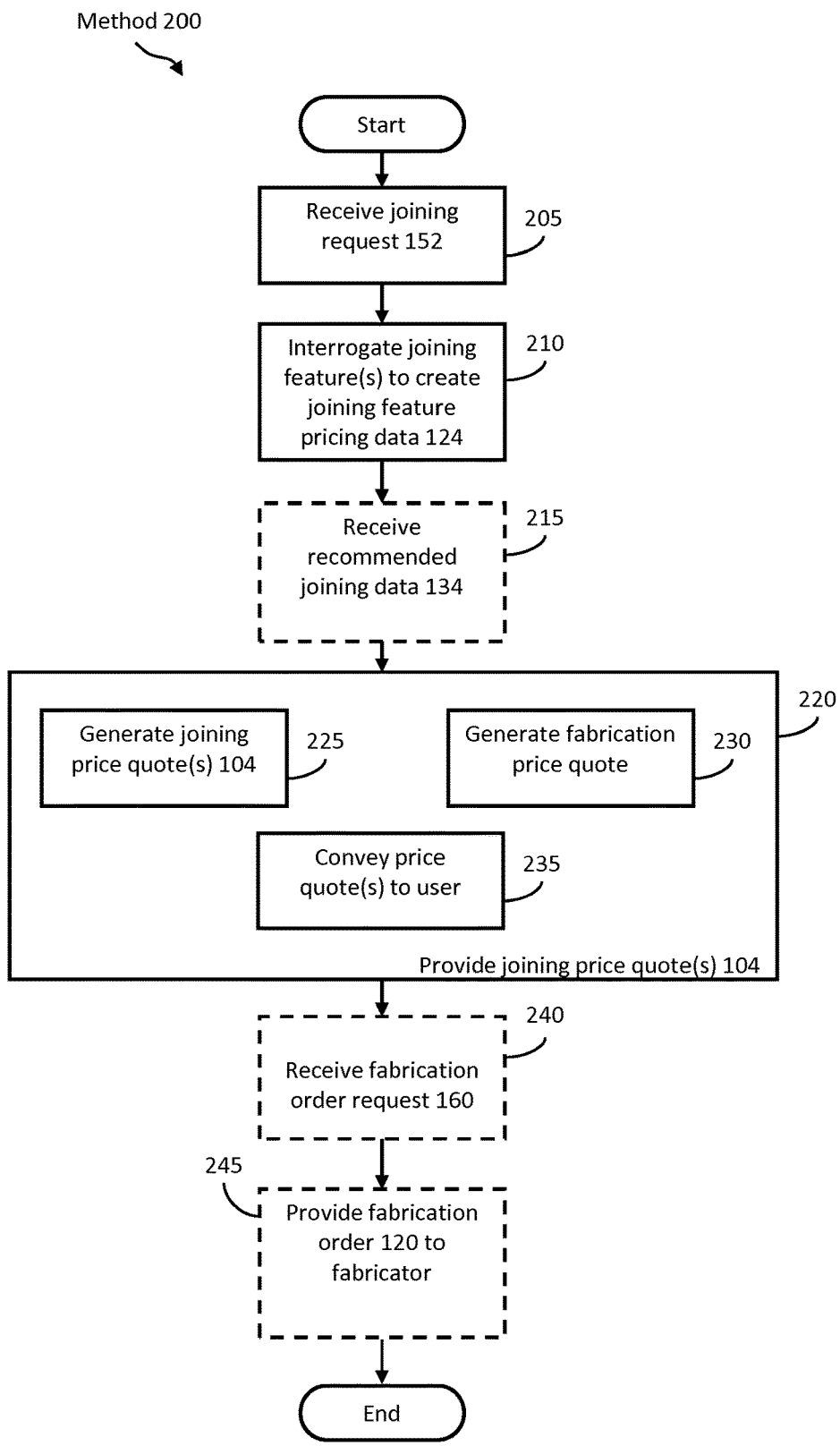
FIG. 2 is a flow diagram illustrating a method of quoting one or more firm fabrication prices to a user and allowing the user to place a fabrication order based on the quoted price(s) that can be implemented by the firm fabrication-price-quoting system of FIG. 1.

FIG. 2 illustrates a joining price quotation and ordering method 200 that is suitable for use as method 140 of FIG. 1. Method 200 is described below in detail. However, before describing method 200 and with continuing reference to FIG. 1, system 100 also includes suitable hardware 144 for executing software 136. In this context, hardware 144 includes all of the corresponding requisite functionality of the physical devices themselves. As those skilled in the art will readily appreciate from reading this entire disclosure, method 140 can be implemented in any suitable computer-based environment, such as in a network of computing devices or in a single computing device. Thus, hardware 144 can include a broad range of computing devices.

Examples of hardware 144 that can be used to implement the various steps of method 140 include, but are not limited to, web servers, desktop computers, laptop computers, tablet computers, smartphones, and Internet appliances, among others. A network of two or more of such devices can include any one or more types of networks, including, but not limited to, a global communications network (such as the Internet), a wide-area network, a local-area network, and a telecommunications network, among others. In this connection, those skilled in the art will also recognize the myriad of ways that the steps of method 140 can be implemented across a network. For example, if any steps of method 140 are implemented on one or more web-servers, they may be performed by suitable software residing on, provided by, and/or executed by such server(s). Such software can include a software application, a software module (such as a plugin to another software application, such as a computer modeling application, web browser, etc.), and/or a software code segment. In many cases, the same or similar software, or any portion thereof, can be implemented on a desktop computer, a laptop computer, and a tablet computer. As another example, various steps of method 140 can be performed by one or more mobile apps running, on, for example, a smartphone or tablet computer, and provided the ability to communicate with one or more other computing devices running software that performs one or more other steps of the method.

In a particular embodiment, all steps of method 140 can be performed by a single computing device, such as a desktop computer or a webserver accessible via a browser, running an integrated software application that performs all steps of method 140 and that may also include computer-modeling functionality as well, such as a computer-modeling software application 148. In another embodiment, some steps of method 140 can be performed on a first computing device, whereas other steps of the method are performed on a second computing device located remotely from the first computing device across a network. Those skilled in the art will understand how to implement any variation reasonably conceivable using only known programming techniques and this disclosure as a guide. Consequently, it is not necessary to describe every potential variation for skilled artisans to practice the present invention to the fullest scope accorded by the appended claims. Regardless of the type of hardware 144 used to implement firm fabrication-price-quotation and/or fabrication-ordering software 136 made in accordance with the present invention, the hardware works in combination with and under the control of such software to form firm fabrication-price-quotation and/or fabrication-ordering system 100, which provides functionality described herein.

Referring now to FIG. 2, and also to FIG. 1 for context and noting that 100-series element numerals correspond to FIG. 1 and 200-series numerals correspond to FIG. 2, at step 205 of method 200 a joining price request 152 may be received by software 136 from a user. As noted above, request 152 is for one or more joining price quote(s) 104 for joining one or more instantiations 108(1) to 108(N) of structure 112, which is represented by computer model 116 containing joining feature(s) 118. Software 136 can receive request 152 in any suitable manner, such as via a user interface (not shown) presented to a user on a computing device accessible to the user. In this example, software 136 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at the appropriate location to make the selection. The manner of selection will depend on the particular hardware 144 and configuration of software 136 being used on the user's computing device. As alluded to above, the user interface containing the user-selectable control can be provided application-specific software running on the user's device or a web-browser or other remote-access means that allows the user to access price-quotation software functionality remotely from the user's device. As another example, request 152 may be a more passive request, such as the user opening an application (not shown) of software 136 that provide a user interface for price quoting and/or fabrication ordering tasks; once the user opens the application, software 136 may initiate various ones of its price-quoting and/or ordering functionalities.

At step 210, in conjunction with the user making joining price request 152, software 136 interrogates (i.e., obtains data from) joining feature(s) 118 from computer model 116 to create joining feature pricing data 124. As described above, joining feature pricing data 124 can be any data that a joining price-quote-generating algorithm 156 of software 136 needs for generating joining price quote(s) 104. An application programming interface (API) for joining price-quote generating algorithm 158 may enable third parties to connect, via software components, into the joining price quote generating algorithm 156 to provide one or more joining price quote(s). In practice, an API is a library that usually includes specifications for routines, data structures, object classes, and variables and can take many forms, including an International Standard such as a portable operating system interface (e.g., based on the POSIX standards), vendor documentation such as the Microsoft Windows API, and/or the libraries of a programming language (e.g., Standard Template Library in C++ or Java API). 158. Joining feature pricing data 124, or a subset thereof, may be found in and automatically extracted from joining feature(s) 118 present in computer model 116. A benefit to this automatic extraction is that a human user is spared the task of determining this information manually or extracting such data semi-automatically and working with that data outside computer model 116. Although the contents of the joining feature pricing data 124 will vary depending on particular embodiments of the invention, data 124 may include feature(s) that influence both joining set-up costs (e.g., number of joining segments in computer model 116) and the joining run-time costs (e.g., total length of joining segments in computer model 116).

Those skilled in the art will understand that software 136 can interrogate joining feature(s) 118 in any of a variety of ways, depending on how data-interrogation code of software 136 is configured. For example, if the data-interrogation code is built into computer-modeling software, such as computer-modeling software application 148, the data-interrogation code may be preprogramed to recognize joining feature(s) 118 within computer model 116 and utilize the internal protocols of that application to gather the that data. As another example, if the data-interrogation code is implemented as an external plugin module to computer-modeling software, the code might utilize the application's plugin module protocols. As yet another example, if the data-interrogation code is executed externally from the computer-modeling application but not as a plugin, the external code may utilize an application programming interface of the application. As yet another example, software 136 may be configured to allow a user to input joining feature(s) 118 via a user interface (not shown) that includes one or more data-input features of one or more differing types, such as, but not necessarily limited to, keyed-input fields, drop-down menus, radio-control selectors, hyperlinks, and other selectors, among others. Regardless of how software 136 and the data-interrogation code are configured, those skilled in the art will readily understand how to design the code.

At optional step 215, software 136 can further receive recommended joining data 134. As described above, in some embodiments, recommended joining data 134 may be used by method 140 to provide joining price quote(s) for joining feature(s) that are not present in computer model 116, but may be acceptable or more desirable alternatives to joining feature(s) 118. Those skilled in the art will readily understand that recommended joining data 134 can be received in any of a variety of ways, depending on how software 136 is configured in a particular instantiation. For example, software 136 may communicate with a joining recommendation algorithm (not shown in FIG. 1) that automatically provides a source of recommended joining data 134 based on one or more of the joining feature(s) 118 of computer model 116. An example of such a configuration is described in U.S. patent application Ser. No. 14/053,222, titled, "AUTOMATED RECOMMENDED JOINING DATA WITH PRESENTED METHODS FOR JOINING IN A COMPUTER-MODELED STRUCTURE" and filed on Oct. 14, 2013, which is incorporated by reference herein for its disclosure of join recommendation processes. In other embodiments, recommended joining data 134 may be specified by the user as alternatives to joining feature(s) 118.

Figure 3:
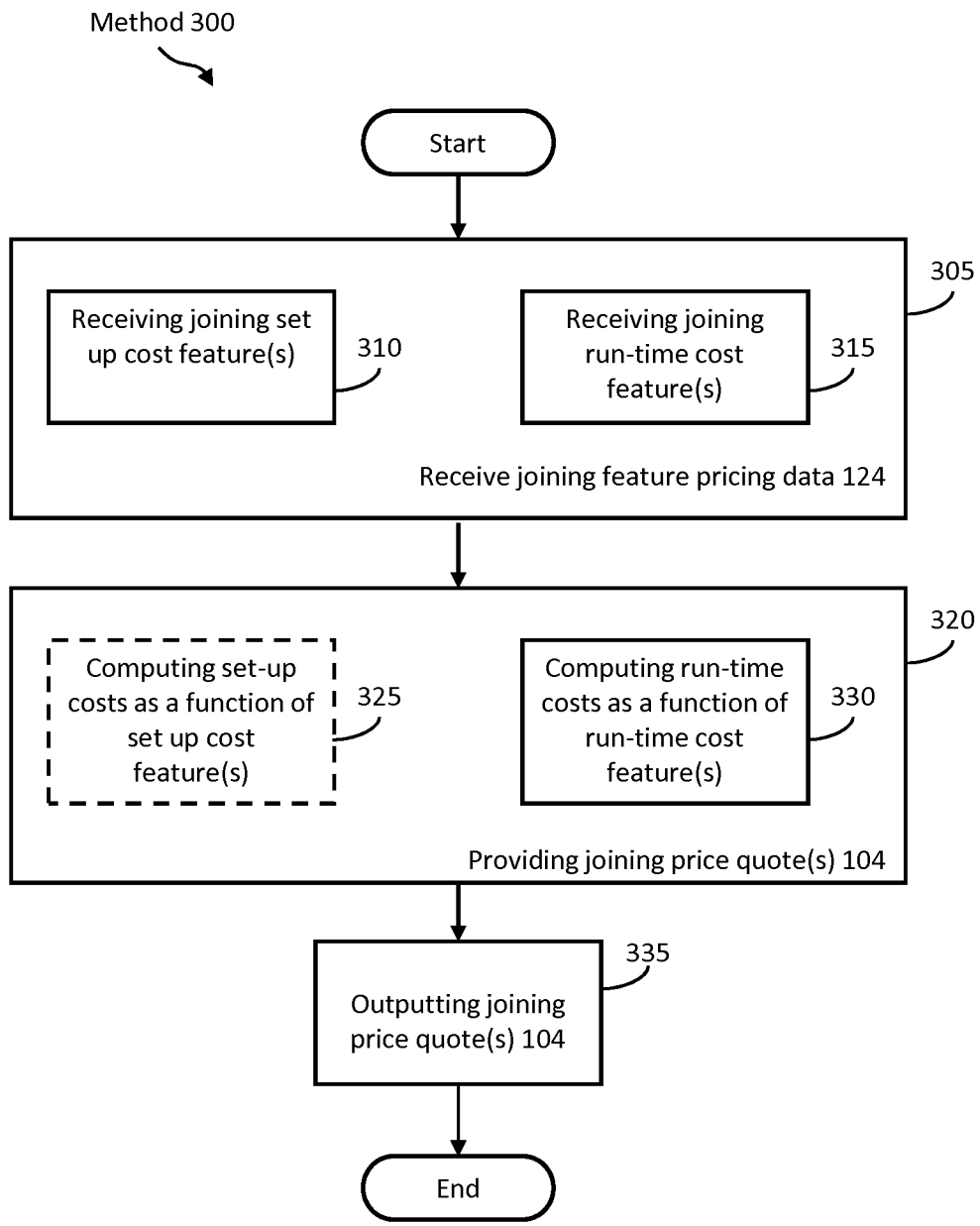
FIG. 3 is a flow diagram illustrating a joining price quote generating method that can be implemented by the firm fabrication-price-quoting system of FIG. 1.

At step 220, software 136 provides joining price quote(s) 104 as a function of joining feature pricing data 124 and joining pricing parameters 132. In some embodiments, software 136 may provide joining price quote(s) 104 also as a function of recommended joining data 134. Depending on the configuration of software 136 and where the various software components of the joining price generating portion of the software are physically executed, step 220 will typically include several substeps. For example, at substep 225, software 136 may generate joining price quote(s) 104 by, for example, applying various ones of joining pricing parameters 132, such as joining rate per hour, material finish base run rate, material type modifiers, etc. to various ones of the joining feature pricing data 124 and, in some embodiments, to recommended joining data 134. FIG. 3 illustrates a joining price quote generating method 300 that is suitable for use as method step 225 of FIG. 2. Method 300 is described below in detail.

The precise joining pricing-quote-generating algorithms 156 used in a particular embodiment will be highly dependent on, for example, the type(s) of structure(s) 112 handled by software 136, as well as the particularities of the fabricator(s) needed to fabricate the instantiation(s). However, algorithms 156 will be readily implemented by those skilled in the art. It is noted that joining price quote(s) 104 can include, for example, a joining price per instantiation and/or a total joining price for multiple instantiations.

Depending on where joining price-quote-generating algorithms 156 are physically executed within system 100 and where various ones of joining pricing parameters 132 are stored within the system, one or more of the pricing parameters may need to be obtained by one computer from another computer within the system. For example, if joining price-quote-generating algorithms 156 are executed on a user computer and joining pricing parameters 132 are stored and updated on a server, such as a fabricator's server, before the pricing algorithms are executed, the portion of software 136 running on the user computer may request the current pricing parameters from the server. In another example in which joining price-quote-generating algorithms 156 are executed on a user computer, joining pricing parameters 132 may be downloaded to the user computer as updates are available. In yet another example wherein joining price-quoting algorithms 156 are executed on a server, such as fabricator's server or a software-as-a-service server, and substantially the entire price-quoting system 100 is based on that server, joining price-quoting parameters 132 would be locally available to joining price-quote-generating algorithms 156 for execution. Of course, these are but a few examples of where joining pricing parameters 132 can be stored and updated relative to where joining price-quote-generating algorithms 156 can be stored and executed.

It is noted that in some embodiments in which at least some aspects of software 136 are integrated with computer-modeling software, such as computer-modeling software application 148, software 136 may be configured to update joining price quote(s) 104 every time a user makes a change to computer model 116 in essentially real time. This can be accomplished, for example, by software 136 monitoring model 116 for any changes that create one or more new joining feature(s) 118 within model 116 and modifying one or more pieces of the joining pricing data in the model. Then, when software 136 detects any new and/or changed data, it can cause joining price-quote-generating algorithms 156 to recalculate joining price quote(s) 104 using the corresponding new and/or changed data. For example, as a user adds an additional joining feature 118 to existing structure 112 within model 116, software 136 may update joining price quote(s) 104 on the fly. In such exemplary embodiments, joining price-quote-generating algorithms 156 may query for updated recommended joining data 134 that may also be generated based on the new and/or changed data. In some alternative embodiments, software 136 may be configured to allow a user working with computer-modeling software, such as computer-modeling software application 148, to select an update button or the like to cause joining price-quote-generating algorithms 156 to update price quote(s) 104 after making changes to structure 112 within computer model 116. Those skilled in the art will readily understand the wide variety of ways that updating of joining price quote(s) 104 can be implemented.

Step 220 may also include an optional substep 230 at which software 136 provides firm fabrication-price quote(s) as a function of the joining price quote(s) 104. For example, software 136 may generate firm fabrication-price quote(s) by combining the joining price quote(s) 104 with other non-joining feature pricing data (not shown in FIG. 1) associated with the computer model 116, such as part costs, non-joining fabrication costs, etc. Illustrative techniques for generating firm fabrication-price quote(s) are described in U.S. patent application Ser. No. 14/060,033, titled, "AUTOMATED FABRICATION PRICE QUOTING AND FABRICATION ORDERING FOR COMPUTER-MODELED STRUCTURES" and filed on Oct. 22, 2013, which is incorporated herein by reference for its teachings of techniques for and relating to generating firm fabrication-price quotes, including firm, good-faith quotes and pre-quotes.

Step 220 may also include a substep 235 at which software 136 conveys joining price quote(s) 104 and, in some embodiments, the firm fabrication-price quote to the user in any one or more of a variety of ways. For example, one or more of the quotes can be displayed on a display screen (not shown) of the user's computer, conveyed in an email, and/or provided in some other type of message, including regular mail, an instant message, a text message, etc. and/or as an attachment thereto, among others. Fundamentally, there are no limitations on how quotes can be conveyed to a user.

In embodiments in which joining price quote(s) 104 are generated based on joining feature pricing data 124 and recommended joining data 134, software 136 may display multiple quotes, including a quote for joining and/or fabricating the computer model 116 using the joining feature(s) 118 and at least one quote for joining and/or fabricating the computer model 116 using the recommended joining data 134. Software 136 may further display differences between these quotes so as to assist the user in deciding whether to select between the joining feature(s) 118 or the recommended joining data 134.

At optional step 240, software 136 may receive a fabrication order request 160 in any suitable manner, such as via a user interface (not shown) presented to a user on a computing device accessible to the user. In this example, software 136 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at the appropriate location to make the selection. The manner of selection will depend on the particular hardware 144 and configuration of software 136 being used on the user's computing device. As alluded to above, the user interface containing the user-selectable control can be provided application-specific software running on the user's device or a web-browser or other remote-access means that allows the user to access price-quotation software functionality remotely from the user's device.

At optional step 245, in response to receiving fabrication order request 160, software 136 provides a fabrication order 120 to the fabricator. Step 250 may be accomplished in any suitable manner, such as sending an email to the fabricator, placing a work order in a queue of a fabricator's scheduling software, among others. Fundamentally, there is no limitation on the way that fabrication order 120 may be made to the fabricator.

It is particularly emphasized that the order of performance of the foregoing steps of method 200 need not be as shown. Rather, they may be implemented in any logical order that results in one or more price quotes and/or one or more fabrication orders.

Reference is now made to FIG. 3, which shows a joining price quote generating method 300. As previously described, method 300 may be suitable for use at method step 225 of FIG. 2 and, in some embodiments, may be executed by joining pricing-quote-generating algorithm 156.

At step 305, joining feature pricing data 124 may be received by joining pricing-quote-generating algorithm 156. As noted above, joining feature pricing data 124 influence the cost of joining one or more instantiations of the structure 112 represented by the computer model 116. Depending on the configuration of joining pricing-quote-generating algorithm 156, step 305 will typically include a step 310 of receiving joining set up cost feature(s), such as the number of joining segments in computer model 116. Step 305 will also typically include a step 315 of receiving joining run-time cost feature(s), such as (but not limited to) the total length of joinings, joining finish, material type, and/or size of joining.

At step 320, joining pricing-quote-generating algorithm 156 provides joining price quote(s) 104 based on the joining feature pricing data 124 and joining pricing parameters 132. Depending on the configuration of joining pricing-quote-generating algorithm 156, step 320 will optionally include a step 325 of computing set-up cost(s) as a function of the set-up cost feature(s) received at step 310 and various joining pricing parameters 132. For example, algorithm 156 may generate the set-up cost(s) as a function of the number of joining segments, welding labor rate per hour, and time to set up the joining work center. The time to set up the joining work center may depend on the material type or other joining pricing parameters 132.

Step 320 will typically include a step 330 of computing run-time cost(s) as a function of the joining run-time cost feature(s) received at step 315 and various joining pricing parameters 132. For example, algorithm 156 may generate the run-time cost(s) by first generating a total run rate time per join segment (e.g., seam weld, spot weld, etc.) as a function of joining finish and material type feature(s), then applying the total run rate time per join segment to the total number of join segments in the computer model 116 to generate run time(s). Labor costs may be applied to the run time(s) to generate the run-time costs(s).

At step 335, the joining pricing-quote-generating algorithm 156 outputs the joining price quote(s) 104. For example, algorithm 156 may add the set-up cost(s) to the run-time cost(s) to generate total cost(s). Total cost(s) may be provided per instantiation and/or for multiple instantiations. Total cost(s) may be provided based on fabricating structure 112 using joining feature(s) 118 and/or recommended joining data 134.

Exemplary Computing Device

As noted above aspects and embodiments described herein may be conveniently implemented using one or more machines (e.g., one or more computing devices/computer systems that are part of a firm fabrication price-quoting and/or ordering system, such as system 100 of FIG. 1) including hardware and special programming according to the teachings of the present specification, as will be apparent to those of ordinary skill in the computer arts. Appropriate software coding can readily be prepared by skilled programmers based on the teachings of the present disclosure, as will be apparent to those of ordinary skill in the software arts.

Such software may be, for example, a computer program product that employs one or more a machine-readable hardware storage mediums. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable hardware storage medium include, but are not limited to, a magnetic disk (e.g., a conventional floppy disk, a hard drive disk), an optical disk (e.g., a compact disk "CD", such as a readable, writeable, and/or rewritable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. Such a data signal or carrier wave would not be considered a machine-readable hardware storage medium. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof.

Figure 4:
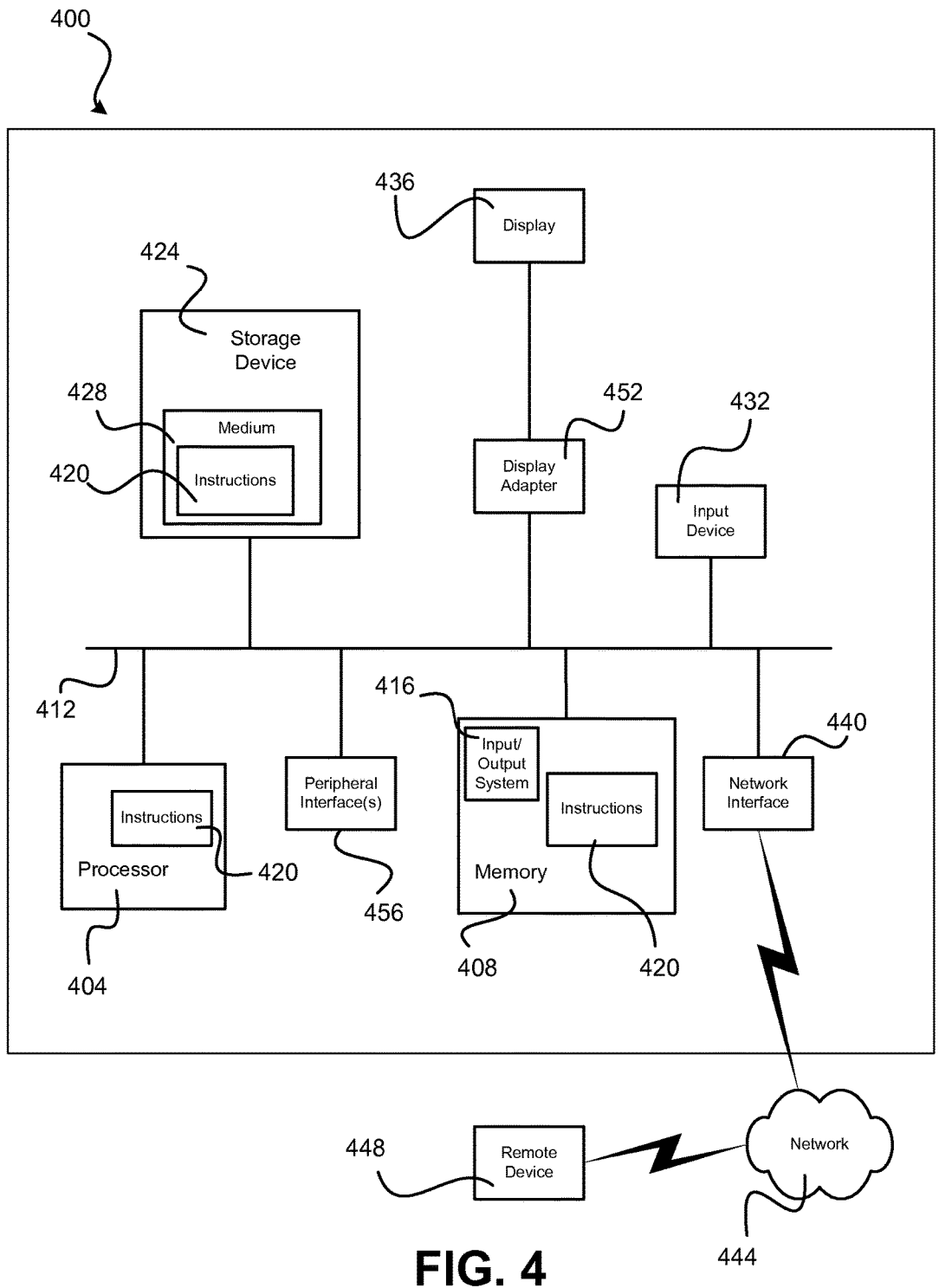
FIG. 4 is a high-level schematic diagram of a computing device that can be used as any one of the computing devices described herein.

FIG. 4 shows a diagrammatic representation of one exemplary embodiment of a computing device 400, within which a set of instructions for causing one or more processors 404 to perform any one or more of the functionalities, aspects, and/or methodologies of the present disclosure. It is also contemplated that multiple computing systems may be utilized to implement a specially configured set of instructions for performing any one or more of the functionalities, aspects, and/or methodologies of the present disclosure in a distributed computing matter.

Computing device 400 can also include a memory 408 that communicates with the one or more processors 404, and with other components, for example, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine-readable hardware storage media) including, but not limited to, a random access memory component (e.g., a static RAM "SRAM", a dynamic RAM "DRAM", etc.), a read only component, and any combinations thereof. In one example, a basic input/output system 416 (BIOS), including basic routines that help to transfer information between elements within computing system 400, such as during start-up, may be stored in memory 408. Memory 408 may also include (e.g., stored on one or more machine-readable hardware storage media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computing device 400 may also include a storage device 424, such as, but not limited to, the machine readable hardware storage medium described above. Storage device 424 may be connected to bus 412 by an appropriate interface (not shown). Example interfaces include, but are not limited to, SCSI, advanced technology attachment (ATA), serial ATA, universal serial bus (USB), IEEE 1494 (FIREWIRE), and any combinations thereof. In one example, storage device 424 (or one or more components thereof) may be removably interfaced with computing system 400 (e.g., via an external port connector (not shown)). Particularly, storage device 424 and an associated machine-readable medium 428 may provide nonvolatile and/or volatile storage of machine-readable instructions, data structures, program modules, and/or other data for computing device 400. In one example, software instructions 420 may reside, completely or partially, within machine-readable hardware storage medium 428. In another example, software instructions 420 may reside, completely or partially, within processors 404.

Computing device 400 may also include an input device 432. In one example, a user of computing system 400 may enter commands and/or other information into computing system 400 via one or more input devices 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device(s) 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device(s) 432 may include a touch screen interface that may be a part of or separate from display(s) 436, discussed further below. Input device(s) 432 may be utilized as a user selection device for selecting one or more graphical representations in a graphical interface as described above.

A user may also input commands and/or other information to computing device 400 via storage device 424 (e.g., a removable disk drive, a flash drive, etc.) and/or network interface device(s) 440. A network interface device, such as any one of network interface device(s) 440, may be utilized for connecting computing system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network, a telephone network, a data network associated with a telephone/voice provider, a direct connection between two computing devices, and any combinations thereof. A network, such as network 444, may employ a wired and/or a wireless mode of communication. In general, any network topology may be used. Information (e.g., data, software instructions 420, etc.) may be communicated to and/or from computing system 400 via network interface device(s) 440.

Computing device 400 may further include one or more video display adapter 452 for communicating a displayable image to one or more display devices, such as display device(s) 436. Examples of a display device include, but are not limited to, a liquid crystal display (LCD), a cathode ray tube (CRT), a plasma display, a light emitting diode (LED) display, and any combinations thereof. Display adapter(s) 452 and display device(s) 436 may be utilized in combination with processor(s) 404 to provide a graphical representation of a utility resource, a location of a land parcel, and/or a location of an easement to a user. In addition to a display device, computing system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a THUNDERBOLT connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of assisting a user in selecting a join for a structure represented in a graphical computer model and providing a firm fabrication-price quote for fabricating one or more instantiations of a structure specified by the computer model, the method comprising:
- receiving, via a join-recommending system, a join request for joining two structures represented in the graphical computer model with a weld;
- receiving, via the join-recommending system, input joining data, wherein receiving the input joining data further comprises:
  - receiving, from a user, a weld location of the two structures; and
  - extracting, from the computer model, characteristics of the two structures, the characteristics including material type and geometry at the weld location;
- generating, within the join-recommending system and in response to said receiving the join request, a recommended joining data as a function of the input joining data, the recommended joining data including at least two different weld types, the recommended joining data including a graphical depiction of each weld type of the two different weld types, the generating step including calculating, based on the input joining data, a joint strength and manufacturing cost for each of the at least two weld types;
- presenting the recommended joining data to the user via a join-recommendation user interface, the interface including a panel for displaying the at least two different weld types and a panel for displaying the calculated joint strength and manufacturing cost for each of the at least two different weld types, wherein displaying the at least two different weld types further includes displaying the graphical depiction of each weld type;
- receiving via the join-recommendation user interface a user selection of the recommended joining data so as to create selected joining data, the selected joining data including a graphical depiction of a selected weld type;
- automatedly associating the selected joining data with the computer model, wherein associating the selected joining data with the computer model further comprises:
  - appending the graphical depiction of the selected weld type to the computer model; and
  - displaying the graphical depiction of the selected weld type with a visual representation of the computer model;
- generating, via a price-quoting system, a price for fabricating the structure represented in the computer model including the selected weld type, wherein generating the price further comprises:
  - extracting pricing data from the computer model; and
  - generating, via the price-quoting system, a joining price quote as a function of the pricing data; and
- conveying a price quote to a user as a function of the price for fabricating the structure.

2. A method according to claim 1, further comprising receiving a joining run-time cost feature and generating a run-time cost as a function of the joining run-time cost feature.

3. A method according to claim 2, wherein said generating the joining price quote includes generating the joining price quote as a function of the joining run-time cost feature.

4. A method according to claim 1, further comprising receiving a joining set-up cost feature and generating a set-up cost as a function of the joining set-up cost feature.

5. A method according to claim 4, wherein said generating the joining price quote includes generating the joining price quote as a function of a joining run-time cost feature and the set-up cost feature.

6. A method according to claim 1, wherein said conveying the joining price quote to the user includes displaying the joining price quote in a user interface.

7. A method according to claim 1, further comprising generating the firm fabrication-price quote as a function of the joining price quote and conveying the firm fabrication-price quote to the user.

8. A method according to claim 7, wherein said conveying the firm fabrication price quote to the user includes displaying the joining price quote in a user interface.

9. A method according to claim 8, further comprising receiving from the user a fabrication order request based on the firm fabrication-price quote.

10. A method according to claim 9, further comprising providing the fabrication order to a fabricator.

* * * * *